United States Patent
Cui

(10) Patent No.: US 11,240,429 B2
(45) Date of Patent: Feb. 1, 2022

(54) TARGET OBJECT ELIMINATION METHOD BASED ON PANORAMIC CAMERA

(71) Applicants: CHINA-GERMANY(ZHUHAI) ARTIFICIAL INTELLIGENCE INSTITUTE CO., LTD., Guangdong (CN); ZHUHAI 4DAGE TECHNOLOGY CO., LTD, Guangdong (CN)

(72) Inventor: Yan Cui, Guangdong (CN)

(73) Assignees: CHINA-GERMANY(ZHUHAI) ARTIFICIAL INTELLIGENCE INSTITUTE CO., LTD., Zhuhai (CN); ZHUHAI 4DAGE TECHNOLOGY CO., LTD, Zhuhai (CN)

( * ) Notice: Subject to any disclaimer, the term of this patent is extended or adjusted under 35 U.S.C. 154(b) by 279 days.

(21) Appl. No.: 16/560,997

(22) Filed: Sep. 4, 2019

(65) Prior Publication Data
US 2020/0204733 A1    Jun. 25, 2020

(30) Foreign Application Priority Data

Dec. 19, 2018 (CN) .......................... 201811566423.4

(51) Int. Cl.
*G06T 7/90* (2017.01)
*H04N 5/232* (2006.01)

(52) U.S. Cl.
CPC .......... *H04N 5/23238* (2013.01); *G06T 7/90* (2017.01); *G06T 2207/10024* (2013.01); *G06T 2207/20216* (2013.01)

(58) Field of Classification Search
CPC ............... H04N 5/23238; G06T 11/00; G06T 2207/10024; G06T 2207/20216; G06T 3/4038; G06T 7/90; G06K 9/3233
See application file for complete search history.

(56) References Cited

U.S. PATENT DOCUMENTS 9,762,794 B2 *  9/2017  Doepke ............. H04N 5/23238
9,947,108 B1 *  4/2018  Chen ................. H04N 5/23229
(Continued)

FOREIGN PATENT DOCUMENTS

CN    101336439 A    12/2008
CN    109064404 A    12/2018
(Continued)

OTHER PUBLICATIONS

Steed, Anthony "Object Removal in Panoramic Media" Proceedings of the 12th European Conference on Visual Media Production, CVMP '15 Nov. 24, 2015, pp. 1-10 (Year: 2015).*

*Primary Examiner* — Jessica M Prince

(57) ABSTRACT

The present invention provides a target object elimination method based on a panoramic camera, the panoramic camera comprising at least two independent lenses, wherein the method comprises following steps: capturing one basic panoramic image by each of the independent lenses; recognizing a target object from each of the basic panoramic images; dividing each of the basic panoramic images into a plurality of image parts having a same or different size, wherein at least one of the image parts comprises the target object; deleting the one image part comprising the target object in each of the basic panoramic images; and combining all remaining image parts in each of the basic panoramic images to obtain a corrected panoramic image from which the target object is eliminated. By the present invention, the target object can be eliminated quickly and efficiently while ensuring the quality of the image.

5 Claims, 4 Drawing Sheets

(56) References Cited

U.S. PATENT DOCUMENTS

| | | | |
|---|---|---|---|
| 2007/0147812 A1 | 6/2007 | Nenonen et al. | |
| 2013/0004100 A1* | 1/2013 | Putraya | G06T 3/4038 |
| | | | 382/284 |
| 2016/0105649 A1* | 4/2016 | Pettegrew | H04N 7/185 |
| | | | 348/37 |
| 2019/0281269 A1* | 9/2019 | Wang | G06F 17/18 |

FOREIGN PATENT DOCUMENTS

| | | |
|---|---|---|
| CN | 109215055 A | 1/2019 |
| JP | 2001325695 A | 11/2001 |

\* cited by examiner

TARGET OBJECT ELIMINATION METHOD BASED ON PANORAMIC CAMERA

CROSS-REFERENCE TO RELATED APPLICATIONS

This application claims the benefit of priority from Chinese Patent Application No. CN201811566423.4, filed on Dec. 19, 2018. The content of the aforementioned application, including any intervening amendments thereto, is incorporated herein by reference in its entirety.

TECHNICAL FIELD

The present invention relates to the technical field of image processing and in particular to a target object elimination method based on a panoramic camera.

BACKGROUND OF THE PRESENT INVENTION

The 3D modeling technology is a process of data representation of an object in a 3D space. A 3D model can be represented by point clouds formed by collecting 3D spatial points of the object. The point clouds can be connected by triangular meshes, lines and polygonal meshes to reconstruct the surface of the model. 3D models can be used in the fields of films, games, manufacturing, etc. The 3D modeling technology, belonging to the multidisciplinary research field, is an important application of computer graphics and image processing in engineering.

A panoramic camera is a camera capable of capturing panoramic images. The commonly used panoramic camera is a dome camera, i.e., fisheye camera. 3D modeling is generally applied to structured scenes such as wall surfaces or table tops, and is mainly suitable for taking photographs of large scenes such as architectures and landscapes. The dome camera can cover a wider scene when it is used to take photographs of landscapes and can cover more people when it is used to take group photographs. Due to a wider angle of view, it can cover a wide range of scenes and objects.

However, the panoramic camera also has some shortcomings. In the case of a large coverage, it is prone to capturing some undesired objects such as photographers, pedestrians or small animals, resulting in errors during 3D modelling. Therefore, there is a need for a method by which target objects can be eliminated.

SUMMARY OF THE PRESENT INVENTION

To solve the deficiencies in the prior art, the present invention provides a target object elimination method based on a panoramic camera, by which the target object can be eliminated quickly and efficiently while ensuring the quality of the image.

For this purpose, the present invention employs the following specific solutions.

A target object elimination method based on a panoramic camera is provided, the panoramic camera comprising at least two independent lenses, wherein the method comprises following steps:

S1: capturing one basic panoramic image by each of the independent lenses;

S2: recognizing a target object from each of the basic panoramic images;

S3: dividing each of the basic panoramic images into a plurality of image parts having a same or different size, wherein at least one of the image parts comprises the target object;

S4: deleting the one image part comprising the target object in each of the basic panoramic images; and S5: combining all remaining image parts in each of the basic panoramic images to obtain a corrected panoramic image from which the target object is eliminated.

Preferably, the panoramic camera comprises two independent lenses that are arranged in opposite directions and each of which has a capturing angle of 220°; the method comprises following steps:

S1: capturing two basic panoramic images by the two independent lenses, respectively;

S2: recognizing a target object from the two basic panoramic images;

S3: dividing the two basic panoramic images into a plurality of image parts having a same or different size, wherein at least one of the image parts comprises the target object;

S4: deleting the one image part comprising the target object in the two basic panoramic images; and S5: combining all remaining image parts in the two basic panoramic images to obtain a corrected panoramic image from which the target object is eliminated.

Preferably, in the step S2, the recognition of the target object from each of the basic panoramic images is realized by artificial recognition or machine recognition.

Preferably, the artificial recognition specifically comprises following steps:

S211: creating two longitudinal reference lines and two latitudinal reference lines on the basic panoramic image;

S212: adjusting positions of the longitudinal reference lines and the latitudinal reference lines, so that the two latitudinal reference lines are respectively located above and below the target object and the two longitudinal reference lines are respectively located on two sides of the target object;

S213: making a rectangular region by using four intersections of the two longitudinal reference lines and the two latitudinal reference lines as vertices; and S214: identifying the rectangular region as the target object, wherein the one image part comprising the target object in the step S3 completely covers the rectangular region.

Preferably, the machine recognition specifically comprises following steps:

S221: determining, as reference factors, the height of the independent lenses and the shape and distance of the target object; and S222: calculating, according to the reference factors, an area of the target object in the basic panoramic image as a target region, wherein the one image part comprising the target object in the step S3 completely covers the target region.

Preferably, in the step S4, each of the image parts is rectangular.

Preferably, in the step S5, the combination of the image parts comprises following steps:

S51: analyzing, based on the RGB gamut, a color value of each pixel in each of the image parts; and S52: for a pixel in a same position, if it has a same color value in each of the image parts, reserving the color value, and if it has a different color value in at least one of the image parts, averaging color values in all the image parts.

Preferably, in the step S1, the target object is located in front of the independent lens whenever the basic panoramic image is captured.

In the present invention, by dividing an image into areas and containing a target object in an image part, the elimination of a target object is changed to the elimination of a certain image part. Thus, the complexity of the method is greatly decreased, and the efficiency is improved. Moreover, the distortion of the processed image is avoided by pixel-level operations.

BRIEF DESCRIPTION OF THE DRAWINGS

In order to explain technical solutions of embodiments of the present invention or in the prior art more clearly, the accompany drawings to be used in the description of the embodiments or the prior art will be introduced simply. Apparently, the drawings to be described below are merely some embodiments of the present invention, a person of ordinary skill in the art can obtain other drawings according to these drawings without paying any creative effort.

DETAILED DESCRIPTION OF THE PRESENT INVENTION

The technical solutions in the embodiments of the present invention will be described clearly and completely with reference to the accompany drawings in the embodiments of the present invention. Apparently, the embodiments to be described are merely some embodiments of the present invention rather than all embodiments of the present invention. Based on the embodiments of the present invention, all other embodiments, obtained by a person of ordinary skill in the art without paying any creative effort, are included in the protection scope of the present invention.

Figure 1:
FIG. 1 is a basic panoramic image captured by one independent lens, according to an embodiment of the present invention.
Figure 2:
FIG. 2 is a basic panoramic image captured by the other independent lens, according to an embodiment of the present invention.
Figure 3:
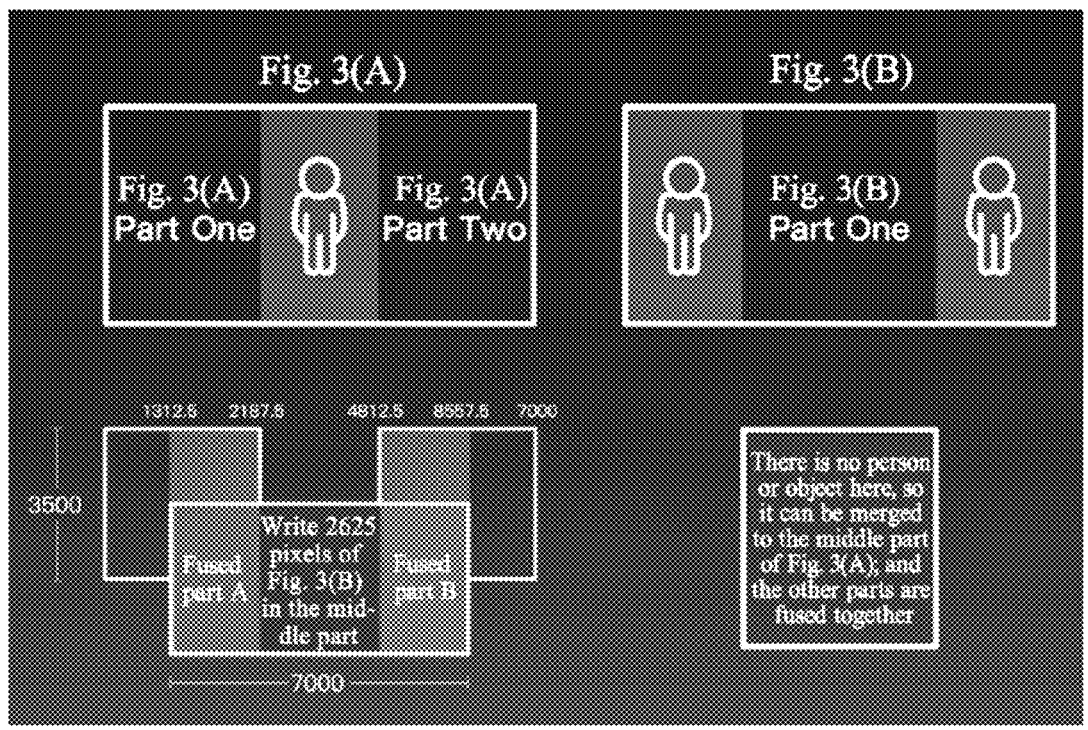
FIG. 3 is a schematic view of the division of an image into areas, according to an embodiment of the present invention.
Figure 4:
FIG. 4 is a target panoramic image obtained after the elimination of the target object, according to an embodiment of the present invention.
Figure 5:
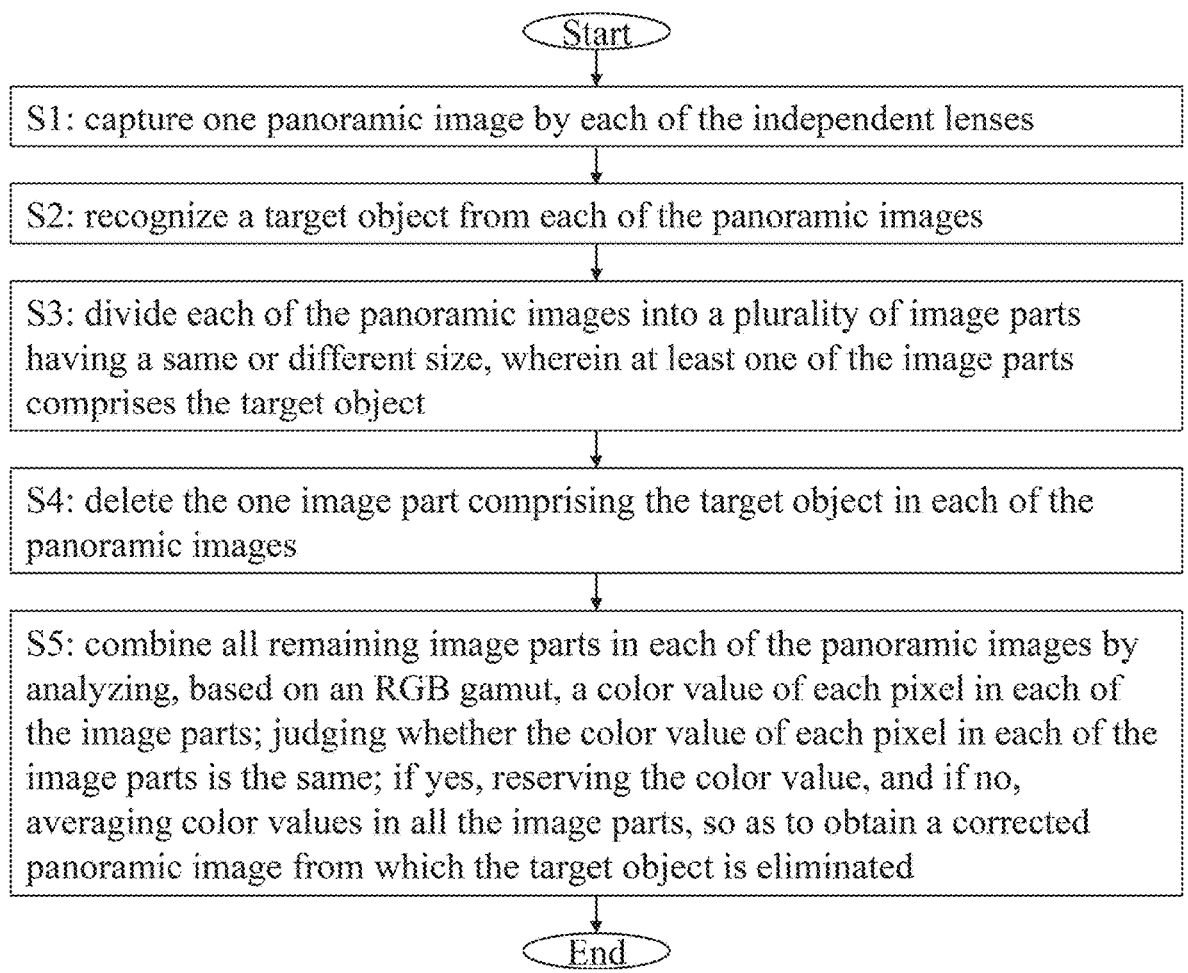
FIG. 5 is a flow diagram illustrating a target object elimination method based on a panoramic camera according to an embodiment of the present invention.
Figure 6:
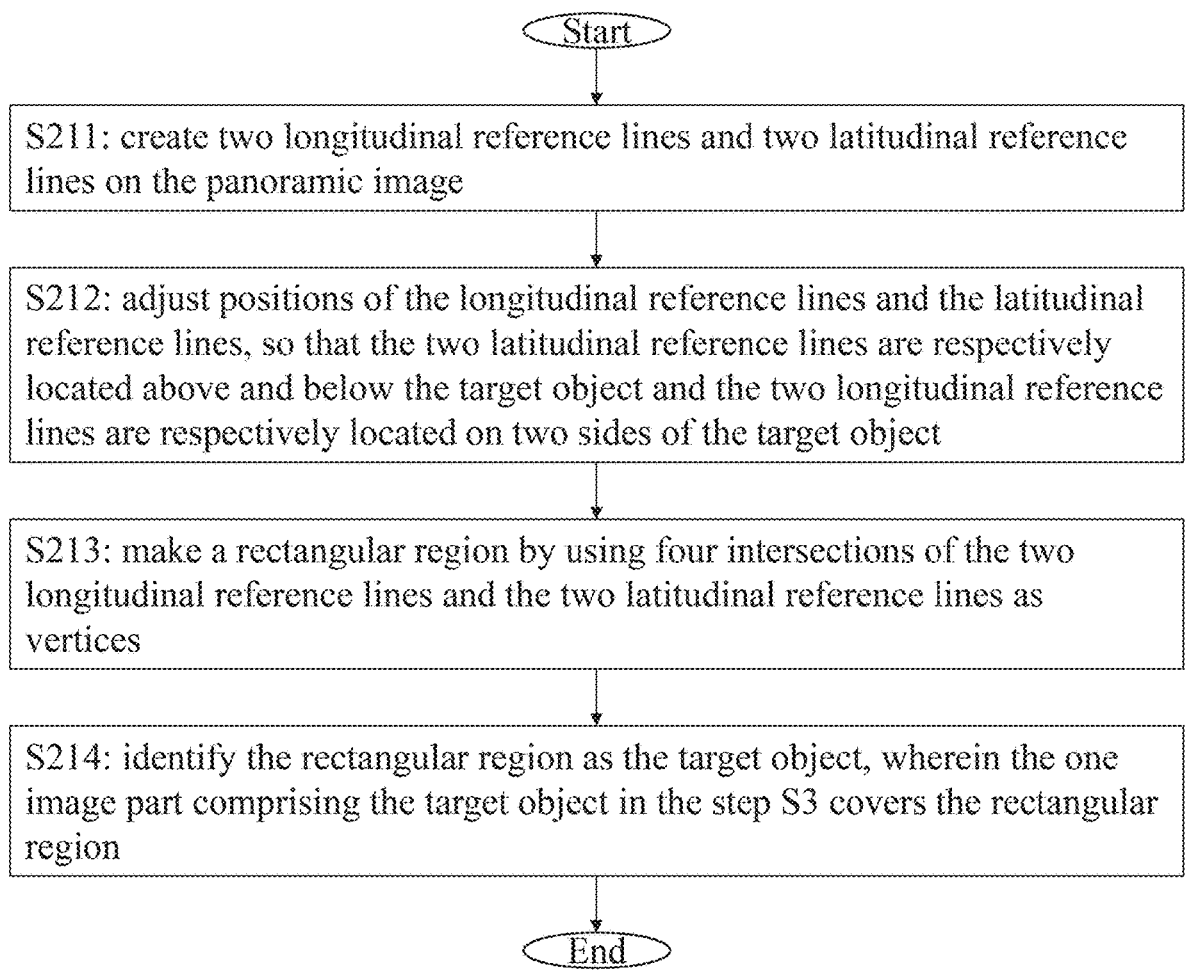
FIG. 6 is a flow diagram illustrating steps of performing artificial recognition for the recognition of the target object from each of the panoramic images.

Reference will be made to FIGS. 1-4. FIG. 1 is a basic panoramic image captured by one independent lens, according to an embodiment of the present invention; FIG. 2 is a basic panoramic image captured by the other independent lens, according to an embodiment of the present invention; FIG. 3 is a schematic view of the division of an image into areas, according to an embodiment of the present invention; and FIG. 4 is a target panoramic image obtained after the elimination of the target object, according to an embodiment of the present invention.

A target object elimination method based on a panoramic camera is provided, the panoramic camera comprising at least two independent lenses, wherein the method comprises following steps S1 to S5.

S1: One basic panoramic image is captured by each of the independent lenses.

S2: A target object is recognized from each of the basic panoramic images.

S3: Each of the basic panoramic images is divided into a plurality of image parts having a same or different size, wherein at least one of the image parts comprises the target object;

S4: The one image part comprising the target object in each of the basic panoramic images is deleted.

S5: All remaining image parts in each of the basic panoramic images are combined to obtain a corrected panoramic image from which the target object is eliminated.

In practice, the target objects may change in real time along with the practical situation and it may be unable to include them in one model. Therefore, in the present invention, the target objects are recognized after obtaining a basic panoramic image. In this way, according to the current scene, a flexible selection may be made on which target objects need to be eliminated, thereby avoiding image chaos.

In this embodiment, the description will be given by one specific example in which the panoramic camera comprises two independent lenses that are arranged in opposite directions and each of which has a capturing angle of 220°. The steps S1 to S5 may be further described as follows.

S1: Two basic panoramic images are captured by the two independent lenses, respectively. The target object is located in front of the independent lens whenever the basic panoramic image is captured.

S2: A target object is recognized from the two basic panoramic images. In the step S2, the recognition of the target object from each of the basic panoramic images is realized by artificial recognition or machine recognition.

The artificial recognition specifically comprises following steps S211 to S214.

S211: Two longitudinal reference lines and two latitudinal reference lines are created on the basic panoramic image.

S212: Positions of the longitudinal reference lines and the latitudinal reference lines are adjusted, so that the two latitudinal reference lines are respectively located above and below the target object and the two longitudinal reference lines are respectively located on two sides of the target object.

S213: A rectangular region is made by using four intersections of the two longitudinal reference lines and the two latitudinal reference lines as vertices.

S214: The rectangular region is identified as the target object, wherein the one image part comprising the target object in the step S3 completely covers the rectangular region.

The artificial recognition may be implemented by image processing software such as Photoshop. The specific process will not be repeated herein.

The machine recognition specifically comprises following steps S221 to S222.

S221: The height of the independent lenses and the shape and distance of the target object are determined as reference factors, wherein the shape may include volume and surface profile.

S222: An area of the target object in the basic panoramic image is calculated as a target region, according to the reference factors, wherein the one image part comprising the target object in the step S3 completely covers the target region.

The machine recognition may be implemented by authoring software.

S3: The two basic panoramic images are divided into a plurality of image parts having a same or different size, wherein at least one of the image parts comprises the target object. To decrease the complexity of this method, the target object should be completely contained in one image part. Accordingly, in the subsequent operation, it is only needed to process this image part.

S4: The one image part comprising the target object in the two basic panoramic images is deleted. Each of the image parts is rectangular.

S5: All remaining image parts in the two basic panoramic images are combined to obtain a corrected panoramic image from which the target object is eliminated. The combination of the image parts comprises following steps S51 to S52.

S51: A color value of each pixel in each of the image parts is analyzed based on the RGB gamut.

S52: For a pixel in a same position, if it has a same color value in each of the image parts, the color value is reserved, and if it has a different color value in at least one of the image parts, color values in all the image parts are averaged.

Usually, at a quite short time interval between two capturing operations, the display effect of a same object and the color value of a same pixel in different basic panoramic images should be completely the same. However, in special circumstances, for example, in the case of sudden change of light, the color value may be different. But the difference is usually small. In this case, by averaging, a small error can be ensured. In this way, the eventually obtained target panoramic image can show the real condition of the object.

In the present invention, by dividing an image into areas and containing a target object in an image part, the elimination of a target object is changed to the elimination of a certain image part. Thus, the complexity of the method is greatly decreased, and the efficiency is improved. Moreover, the distortion of the processed image is avoided by pixel-level operations.

The description of the disclosed embodiments is provided to enable those skilled in the art to implement or use the present invention. Various modifications to these embodiments will become apparent to those skilled in the art, and the general principle defined here can be practiced in other embodiments without departing from the spirit or scope of the present invention. Accordingly, the present invention will not be limited to these embodiments described here but shall be accorded with the broadest scope in consistency with the principle and novel features disclosed here.

What is claimed is:

1. A target object elimination method based on a panoramic camera, the panoramic camera comprising at least two independent lenses, wherein the method comprises following steps:

S1: capturing one panoramic image by each of the independent lenses;
S2: recognizing a target object from each of the panoramic images;
S3: dividing each of the panoramic images into a plurality of image parts having a same or different size, wherein at least one of the image parts comprises the target object;
S4: deleting the one image part comprising the target object in each of the panoramic images; and
S5: combining all remaining image parts in each of the panoramic images to obtain a corrected panoramic image from which the target object is eliminated;
wherein, in the step S5, the combination of the image parts comprises following steps:
S51: analyzing, based on an RGB gamut, a color value of each pixel in each of the image parts; and
S52: judging whether the color value of each pixel in each of the image parts is the same; if yes, reserving the color value, and if no, averaging color values in all the image parts.

2. The target object elimination method based on the panoramic camera according to claim 1, wherein, in the step S2, the recognition of the target object from each of the panoramic images is realized by artificial recognition.

3. The target object elimination method based on the panoramic camera according to claim 2, wherein the artificial recognition comprises following steps:

S211: creating two longitudinal reference lines and two latitudinal reference lines on the panoramic image;
S212: adjusting positions of the longitudinal reference lines and the latitudinal reference lines, so that the two latitudinal reference lines are respectively located above and below the target object and the two longitudinal reference lines are respectively located on two sides of the target object;
S213: making a rectangular region by using four intersections of the two longitudinal reference lines and the two latitudinal reference lines as vertices; and
S214: identifying the rectangular region as the target object,
wherein the one image part comprising the target object in the step S3 covers the rectangular region.

4. The target object elimination method based on the panoramic camera according to claim 1, wherein, in the step S4, each of the image parts is rectangular.

5. The target object elimination method based on the panoramic camera according to claim 1, wherein, in the step S1, the target object is located in front of the independent lens whenever the panoramic image is captured.

* * * * *